Figure 1:
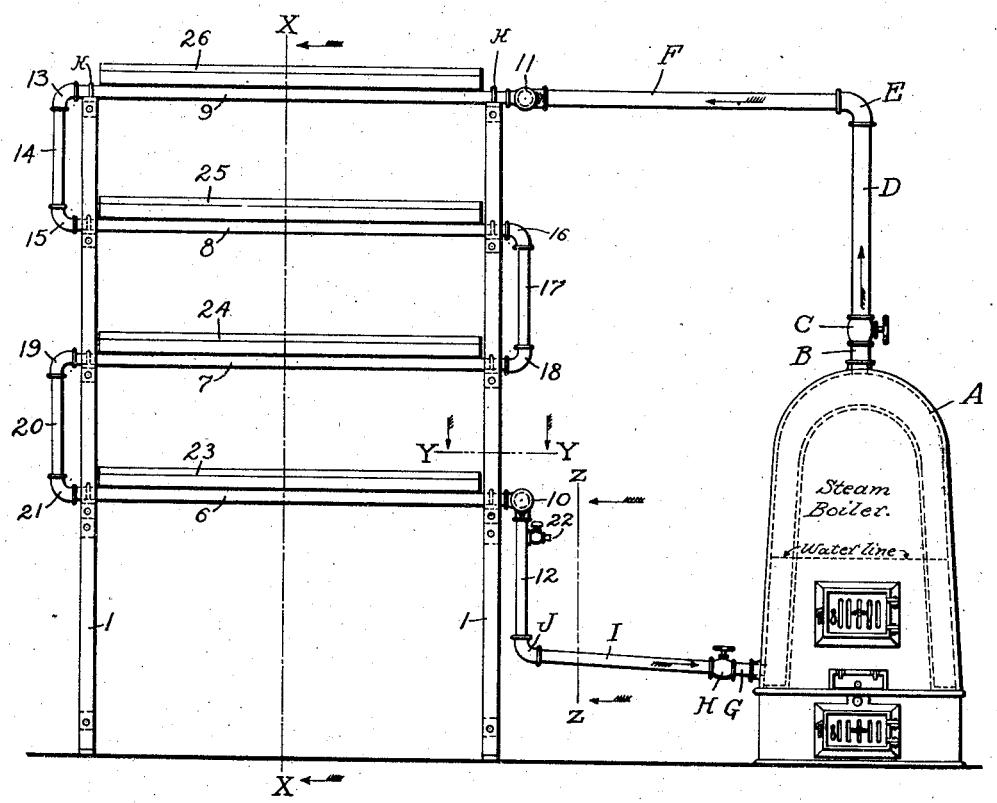

No. 768,438. PATENTED AUG. 23, 1904.
S. L. FEATHERS.
FRUIT DRIER.
APPLICATION FILED DEC. 7, 1903.
NO MODEL. 2 SHEETS—SHEET 1.

WITNESSES
S. C. Duvall.
R. E. Randle.

INVENTOR,
S. L. FEATHERS,
by her attorney,
Robert W. Randle.

No. 768,438. PATENTED AUG. 23, 1904.
S. L. FEATHERS.
FRUIT DRIER.
APPLICATION FILED DEC. 7, 1903.
NO MODEL. 2 SHEETS—SHEET 2.

WITNESSES
S. C. Durall.
R. E. Randle.

INVENTOR,
S. L. FEATHERS;
by her attorney,
Robert W. Randle.

No. 768,438. Patented August 23, 1904.

UNITED STATES PATENT OFFICE.

SARAH L. FEATHERS, OF PRAIRIE CITY, IOWA.

FRUIT-DRIER.

SPECIFICATION forming part of Letters Patent No. 768,438, dated August 23, 1904.

Application filed December 7, 1903. Serial No. 184,045. (No model.)

*To all whom it may concern:*

Be it known that I, SARAH L. FEATHERS, a citizen of the United States, residing at Prairie City, in the county of Jasper, State of Iowa, have invented certain new and useful Improvements in Fruit-Driers, of which the following is a specification, which when taken in connection with the accompanying drawings, forming a part thereof, is sufficiently clear and concise as to enable others skilled in the art to which it appertains to make and use the same.

My present invention contemplates a radical reconstruction of the constituent elements of devices of this general character combined with new devices and operations and the adoption of old principles with their mechanical constructions reduced to their simplest proposition and as a natural sequence accentuating the utilitarian residual benefits and adapting them to subserve the highest economic ends.

My present invention has relation to an arrangement for drying fruits or the like by means of radiated steam-heat or hot water in connection with the construction herein shown.

The object of my invention, broadly speaking, is in the provision of a simplified means for the desiccation of fruit or the like by means of the radiation of the heat derived from steam or hot water.

A further object is to produce a simple and inexpensive apparatus for removing the aqueous secretions from fruit or the like and rendering the fruit thus treated in a condition to be preserved from disintegration or from returning to its prearranged constituent elements.

A further object is to provide an apparatus for drying fruit or the like quickly and inexpensively without the need of providing especially-constructed buildings therefor, in fact, needing no buildings or housing at all where the rainfall or humidity will permit.

Another object is to provide a fruit-drying apparatus consisting of interdependent and coöperating elements combined in a systematized composite of tested and interrelated means for the accomplishment of the production of a perfect product and that at a material reduction for cost and labor devoted to its installation and operation.

Another object is to provide a fruit-evaporating apparatus which will occupy a comparatively small amount of space and at the same time will provide a comparatively great area of surface for fruit to be evaporated thereby, and therefore, by reason of its compactness, providing means whereby a large amount of fruit may be evaporated by a single attendant, and, finally, another object is to provide a fruit or vegetable drying apparatus by which the work may proceed continuously and may at all times be observed by the attendant as the process proceeds, consequently providing means whereby the fruit or vegetables may be shifted or removed at the proper time to obtain the most satisfactory results.

Other objects and specific advantages of my invention will appear from the following specification, from the accompanying drawings, forming a part thereof, and as colligated in the claim hereunto appended.

My invention consists in a fruit-drying apparatus embodying new and useful features and details of construction and relative disposition of the several parts, substantially as particularly described otherwhere in this specification and in the legitimate combinations thereof.

One manner of carrying out the invention and that which in practice has been found the most desirable is illustrated in the accompanying drawings, in which—

Figure 2:
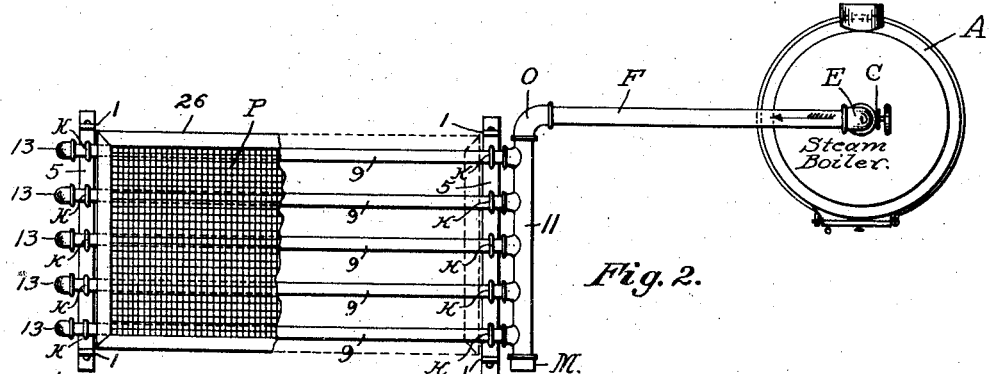
Figure 3:
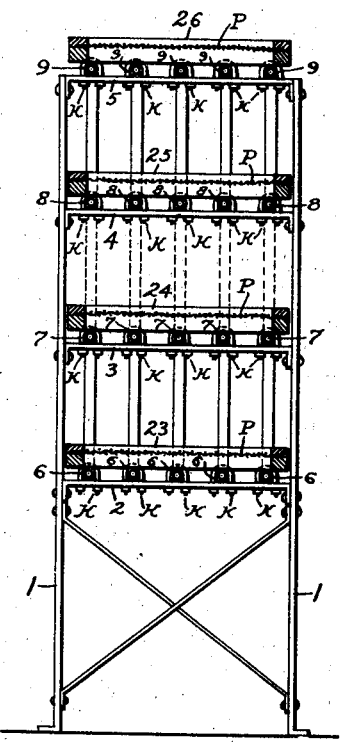
Figure 4:
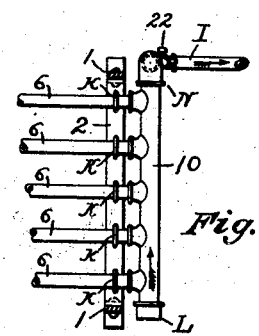
Figure 5:
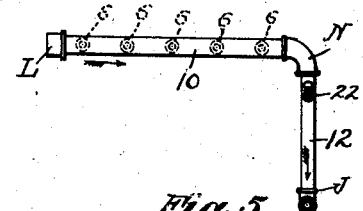

Figure 1 is a longitudinal front elevation of my entire apparatus. Fig. 2 is a top plan view of the same. Fig. 3 is a cross-section of the same, taken on the line X X of Fig. 1. Fig. 4 is a detail top plan of one of the end portions, taken on the line Y Y of Fig. 1; and Fig. 5 is a detail outside elevation of the parts shown in Fig. 4, taken on the line Z Z of Fig. 1.

Similar indices refer to similar parts throughout the several views of the drawings.

In the drawings the letter A denotes a steam-generating boiler of any preferred form or construction, to which I make no claim, in which there is ample steam-space and means for supplying fuel and water thereto in any well-known manner. Leading from the dome of the steam-space of the boiler is a nipple B, having threaded to its upper end the controling-valve C, and from the latter extends up the pipe D, having on its upper end the L-fitting E, and from the latter extends out the horizontal pipe F. Extending out from the lower portion of the water-space in the boiler is a nipple G, having threaded to its outer end the return-valve H, and extending out from the latter at an angle is the pipe I, having on its outer end the L-fitting J.

In the construction of my device I provide four or more vertical supports 1, their lower portions forming legs and having means thereon for securing various parts thereto, as shown. Extending across horizontally between each of the supports 1 are the tie members 2, 3, 4, and 5, spaced the desired distance apart and bolted at their ends to the supports 1, as shown. Disposed across and resting on said tie members is a series of pipes beginning at the bottom. Each series is designated by the numerals 6, 7, 8, and 9, respectively, and each series may consist of any desired number of pipes, which in this instance I have shown five as perhaps being most preferable to the proportions otherwise given. Said pipes are equally spaced on the tie members, which supports the ends of the pipes and are secured thereto by double-pointed eyebolts K, the prongs of which pass through holes in the tie members, the eyes being above and passing over the pipes and the lower ends being threaded and provided with nuts to contact with the under side of said tie members, as shown in Fig. 8, whereby said pipes may be securely fastened in position.

The numeral 10 represents the lower, and 11 the upper, distributing-pipes, each having a row of protuberances internally threaded equally disposed with reference to each other to receive therein the inner ends of the lower and upper series of pipes Y and 9, respectively. The lower pipe 10 is closed at one end by the cap L, and the upper pipe 11 is closed at one end by the cap M, the other ends of said pipes 10 and 11 being provided with an L-fitting N and O, respectively. In the fitting N is secured the downwardly-extending pipe 12, the other end thereof being secured in the fitting J, above referred to, and in the fitting O is secured the outer end of the pipe F, above referred to.

On the ends of the pipes 9 opposite the distributing-pipe 11 is secured an L-fitting 13, each having a downwardly-extending pipe 14, which latter have on their lower ends the L-fittings 15, into which is secured the outer ends of the pipes of series 8. The inner ends of the pipes 8 are each provided with an L-fitting 16, and secured in the latter and extending down therefrom are the pipes 17, to the lower ends of which are secured the L-fittings 18, in which latter is secured the inner ends of the pipes of the series 7. The outer ends of the pipes 7 are each provided with an L-fitting 19, and secured in the latter and extending down therefrom are the pipes 20, to the lower ends of which are secured the L-fittings 21, in which latter is secured the outer ends of the pipes of the series 6. It is apparent that all of said pipes may be assembled as shown and described, it being understood that the various pipes and fittings are threaded in the usual manner to form steam-tight joints, and which it is manifest that a complete circuit is established through the various pipes from the dome of the boiler and returning to the lower portion of the interior of the boiler, as indicated, and that said circuit may be established or closed by means of the valves C and H.

The numeral 22 denotes an air-valve located in the pipe 12, which is especially intended for releasing the cold air in the pipes when the steam is first turned in from the boiler and also for releasing superfluous condensation.

It will be observed that each of the series of pipes 6, 7, 8, and 9 forms a shelf on which may be disposed a removable tray 23, 24, 25, and 26 of identical construction, each of said trays being composed of a frame with a wire P stretched thereover and secured to the upper edges of said frame, with a strip secured to the upper edges of said frame above the edges of the said screen forming a coping to prevent the fruit from inadvertently falling from the trays. It will be observed that the trays are so constructed that the wire screens P will be held some distance from the horizontal steam-pipes and also that the trays may be easily removed and positioned by sliding them sidewise over the pipes on which they rest.

It will now be apparent that a head of steam may be maintained in the boiler, and by opening the valves C and H the steam will pass through the pipes and fittings to the distributing-pipe 11 and from there will pass through the series of pipes 9 to the left, thence down and to the right through the series of pipes 8, thence down and through the series of pipes 7 to the left, thence down and through the series of pipes 6 to the right into the distributing-pipe 10, by which time the steam will have become more or less condensed and will plow through the pipe I to the boiler to again be converted into live steam. The passage of the steam through the various ramifications of the pipes will cause the pipes to become heated thereby. Consequently if the trays be loaded with fruit previously prepared for the trays the radiated heat from the pipes will pass through the wire screens on which the fruit is placed, and the heat coming in contact with the fruit will drive out the aqueous properties thereof and will leave the solid matter of the fruit in the condition desired.

It will be observed that any number of series of horizontal pipes may be employed with means whereby the trays may be of any desired dimensions and that one or more systems may be connected to a single boiler.

From the above description, taken in connection with the accompanying drawings, it will be seen that I have produced an improved fruit-drying system embodying the objects otherwhere referred to in this specification and consisting of the specific construction pointed out in the appended claims.

While I have illustrated and described the best means now known to me for carrying out the objects of my invention, I desire it to be understood that I do not restrict myself to the exact details of construction shown and described, but hold that any slight changes or variations in such details as would suggest themselves to the ordinary mechanic would clearly fall within the limits and scope of my invention.

Having now fully shown and described my invention, what I claim, and desire to secure by Letters Patent of the United States, is—

An improved fruit-drying apparatus comprising in combination with the boiler and with each other, a number of series of pipes arranged horizontal with one series above the others and separated some distance from each other, the corresponding pipes of one series being coupled to the corresponding pipes of the next series at one end by vertical pipes, an upper distributing-pipe into which one end of each of the pipes of the upper series or horizontal pipes opens, a lower distributing-pipe into which one end of each of the pipes of the lower series opens, a supporting-frame for all of said series of pipes, said frame consisting of the vertical supports 1 with their lower portions forming legs, a series of tie members spaced apart and bolted at their ends to said supports, bolts K which bolts are doubled over said pipes with the ends extending through holes in the tie members and secured therebelow by nuts whereby each end of the pipes of each series is securely fastened to said tie members, a pipe connecting the boiler with the upper distributing-pipe and disposed horizontal, a pipe connecting the boiler with the lower distributing-pipe and disposed at an angle from the boiler upward, a tray resting on each of said series of pipes, said trays each consisting of a frame with a screen extending thereover secured to the members of the frame midway of their height, a controlling-valve located in each of the pipes leading from the boiler, and an air-valve for allowing for the escape of air from said series of pipes, all substantially as shown and described.

In testimony whereof I have hereunto signed my name to this specification in the presence of two subscribing witnesses.

SARAH L. FEATHERS.

Witnesses:
   M. FEATHERS,
   A. A. ARNOLD.